United States Patent [19]
Gibson et al.

[11] Patent Number: 6,050,640
[45] Date of Patent: Apr. 18, 2000

[54] BUCKLE LATCH MECHANISM FOR INFANT CAR SEAT

[75] Inventors: William R. Gibson, Kent; Paul K. Meeker, Hiram, both of Ohio

[73] Assignee: Evenflo Company, Inc., Vandalia, Ohio

[21] Appl. No.: 09/177,177

[22] Filed: Oct. 22, 1998

[51] Int. Cl.⁷ .................................................. A47C 1/08
[52] U.S. Cl. ........................................ 297/250.1; 297/464
[58] Field of Search ................................. 297/250.1, 464

[56] References Cited

U.S. PATENT DOCUMENTS

| | | | |
|---|---|---|---|
| D. 277,811 | 3/1985 | Moore | D3/31 |
| D. 357,800 | 5/1995 | Roan et al. | D3/214 |
| D. 365,925 | 1/1996 | Roan | D3/214 |
| D. 385,105 | 10/1997 | Fair | D3/214 |
| 3,248,125 | 4/1966 | Gill | 280/47.4 |
| 3,989,173 | 11/1976 | Gebhard | 224/6 |
| 4,234,229 | 11/1980 | Arnold | 297/467 |
| 4,492,326 | 1/1985 | Storm | 224/160 |
| 4,736,959 | 4/1988 | Van Steenburg | 280/30 |
| 4,858,947 | 8/1989 | Yee et al. | 280/643 |
| 5,098,161 | 3/1992 | Minami et al. | 297/250.1 X |
| 5,240,265 | 8/1993 | Huang | 280/47.4 |
| 5,246,152 | 9/1993 | Dotseth | 224/159 |
| 5,286,090 | 2/1994 | Templin et al. | 297/250.1 X |
| 5,522,528 | 6/1996 | Petricola | 224/160 |
| 5,609,279 | 3/1997 | O'Shea | 224/160 |
| 5,632,425 | 5/1997 | Hull | 224/160 |
| 5,669,625 | 9/1997 | Jane Cabagnero | 280/647 |
| 5,678,739 | 10/1997 | Darling et al. | 224/160 |
| 5,687,985 | 11/1997 | Sack | 280/650 |
| 5,690,258 | 11/1997 | Kataoka | 224/160 |
| 5,692,655 | 12/1997 | Fair et al. | 224/160 |

*Primary Examiner*—Milton Nelson, Jr.
*Attorney, Agent, or Firm*—Thompson Hine & Flory LLP

[57] ABSTRACT

A buckle latch mechanism for an infant carrier including a buckle latch mechanism for an infant carrier. The buckle latch mechanism includes a slot formed in a frame adjacent the foot end of an infant carrier essentially transverse to the side walls. A generally rigid plastic latch is reciprocally mounted in the frame forwardly of the slot. The latch has a rearwardly extending lower extent beneath the frame movable from a locking position beneath the slot to an unlocked position forwardly of the slot. The latch has an operator controlled upper extent above the frame movable between a locked orientation in proximity to the slot and an unlocked postioned forwardly thereof. The latch has a vertically extending intermediate extent between the lower extent and the upper extent. The intermediate extent has a cylindrical aperture therethrough. A horizontal post is fixedly positioned beneath the upper surface of the frame. The post has a rearward end adjacent to the slot and a forward end at an adjacent portion of the frame. A spring is included and has a rearward end in contact with the intermediate portion of the lock urging the lock rearwardly with the lower extent into the locking orientation. The spring has a forward end providing an abutment surface for the transmission of force to urge the lock rearwardly.

6 Claims, 6 Drawing Sheets

BUCKLE LATCH MECHANISM FOR INFANT CAR SEAT

BACKGROUND OF THE INVENTION

1. Field of the Invention

The present invention relates to a buckle latch mechanism for an infant carrier and more particularly pertains to receiving and retaining the tongue of a belt assembly of an infant carrier in a safer, more convenient manner.

2. Description of the Prior Art

The use of infant carriers and latch mechanisms of known designs and configurations is known in the prior art. More specifically, infant carriers and latch mechanisms of known designs and configurations heretofore devised and utilized for the purpose of coupling and uncoupling belt assemblies of child care products through known methods and apparatuses are known to consist basically of familiar, expected, and obvious structural configurations, notwithstanding the myriad of designs encompassed by the crowded prior art which has been developed for the fulfillment of countless objectives and requirements.

While known prior art devices fulfill their respective, particular objectives and requirements, the aforementioned patents do not describe a buckle latch mechanism for an infant carrier that allows receiving and retaining the tongue of a belt assembly of an infant carrier in a safer, more convenient manner In this respect, the buckle latch mechanism for an infant carrier according to the present invention substantially departs from the conventional concepts and designs of the prior art, and in doing so provides an apparatus primarily developed for the purpose of receiving and retaining the tongue of a belt assembly of an infant carrier in a safer, more convenient manner.

Therefore, it can be appreciated that there exists a continuing need for a new and improved a buckle latch mechanism for an infant carrier which can be used for receiving and retaining the tongue of a belt assembly of an infant carrier in a safer, more convenient manner. In this regard, the present invention substantially fulfills this need.

SUMMARY OF THE INVENTION

In view of the foregoing disadvantages inherent in the known types of infant carriers and latch mechanisms of known designs and configurations now present in the prior art, the present invention provides an improved a buckle latch mechanism for an infant carrier. As such, the general purpose of the present invention, which will be described subsequently in greater detail, is to provide a new and improved a buckle latch mechanism for an infant carrier and method which has all the advantages of the prior art and none of the disadvantages.

To attain this, the present invention essentially comprises a new and improved buckle latch mechanism for receiving and retaining the tongue of a belt assembly of an infant carrier. The buckle latch mechanism includes an essentially rigid frame. The frame has an upper surface for receiving padding and a child thereon. The frame also has a lower surface for being supported on a recipient area. The frame also has a foot end and a head end with generally parallel side walls therebetween. A belt assembly is provided for retaining a child safely positioned within the shell. The belt assembly has a lower free end with a rigid tongue formed with an aperture therethrough. The aperture is adapted to be selectively received and retained by a buckle latch mechanism. A buckle latch mechanism comprising a slot formed in the frame adjacent the foot end essentially transverse to the side walls. A generally rigid plastic latch is reciprocally mounted in the frame forwardly of the slot. The latch has a rearwardly extending lower extent beneath the frame. The lower extent is movable from a locking position beneath the slot to an unlocked position forwardly of the slot. The rearward end of the lower extent is angled whereby downward movement of a tongue thereagainst will move the latch forwardly. The latch has an operator controlled upper extent above the frame movable between a locked orientation in proximity to the slot and an unlocked positioned forwardly thereof. The latch has a vertically extending intermediate extent between the lower extent and the upper extent. The intermediate extent has a cylindrical aperture therethrough. A horizontal post fixedly positioned beneath the upper surface of the frame has a rearward end adjacent to the slot and a forward end at an adjacent portion of the frame. Next provided is a coil spring. The coil spring has a rearward end in contact with the intermediate portion of the lock urging the lock rearwardly with the lower extent into the locking orientation. The spring has a forward end providing an abutment surface for the transmission of force to urge the lock rearwardly but to allow movement of the lock forwardly against the action of the spring upon an operator's forward motion of the upper portion of the lock.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved a buckle latch mechanism for an infant carrier which has all of the advantages of the prior art infant carriers and latch mechanisms of known designs and configurations and none of the disadvantages.

It is another object of the present invention to provide a new and improved a buckle latch mechanism for an infant carrier which may be easily and efficiently manufactured and marketed.

It is further object of the present invention to provide a new and improved a buckle latch mechanism for an infant carrier which is of durable and reliable constructions.

An even further object of the present invention is to provide a new and improved a buckle latch mechanism for an infant carrier which is susceptible of a low cost of manufacture with regard to both materials and labor, and which accordingly is then susceptible of low prices of sale to the consuming public, thereby making such a buckle latch mechanism for an infant carrier economically available to the buying public.

Even still another object of the present invention is to provide a buckle latch mechanism for an infant carrier for receiving and retaining the tongue of a belt assembly of an infant carrier in a safer, more convenient manner.

Lastly, it is an object of the present invention to provide a new and improved buckle latch mechanism for an infant carrier including a buckle latch mechanism for an infant carrier. The buckle latch mechanism includes a slot formed in a frame adjacent the foot end of an infant carrier essentially transverse to the side walls, a generally rigid plastic latch reciprocally mounted in the frame forwardly of the slot. The latch has a rearwardly extending lower extent beneath the frame movable from a locking position beneath the slot to an unlocked position forwardly of the slot and an operator controlled upper extent above the frame movable between a locked orientation in proximity to the slot and an unlocked positioned forwardly thereof. The latch has a vertically extending intermediate extent between the lower extent and the upper extent. The intermediate extent has a cylindrical aperture therethrough. A horizontal post is fixedly positioned beneath the upper surface of the frame. The post has a rearward end adjacent to the slot and a forward end at an adjacent portion of the frame. A spring is included and has a rearward end in contact with the intermediate portion of the lock urging the lock rearwardly with the lower extent into the locking orientation. The spring has a forward end providing an abutment surface for the transmission of force to urge the lock rearwardly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
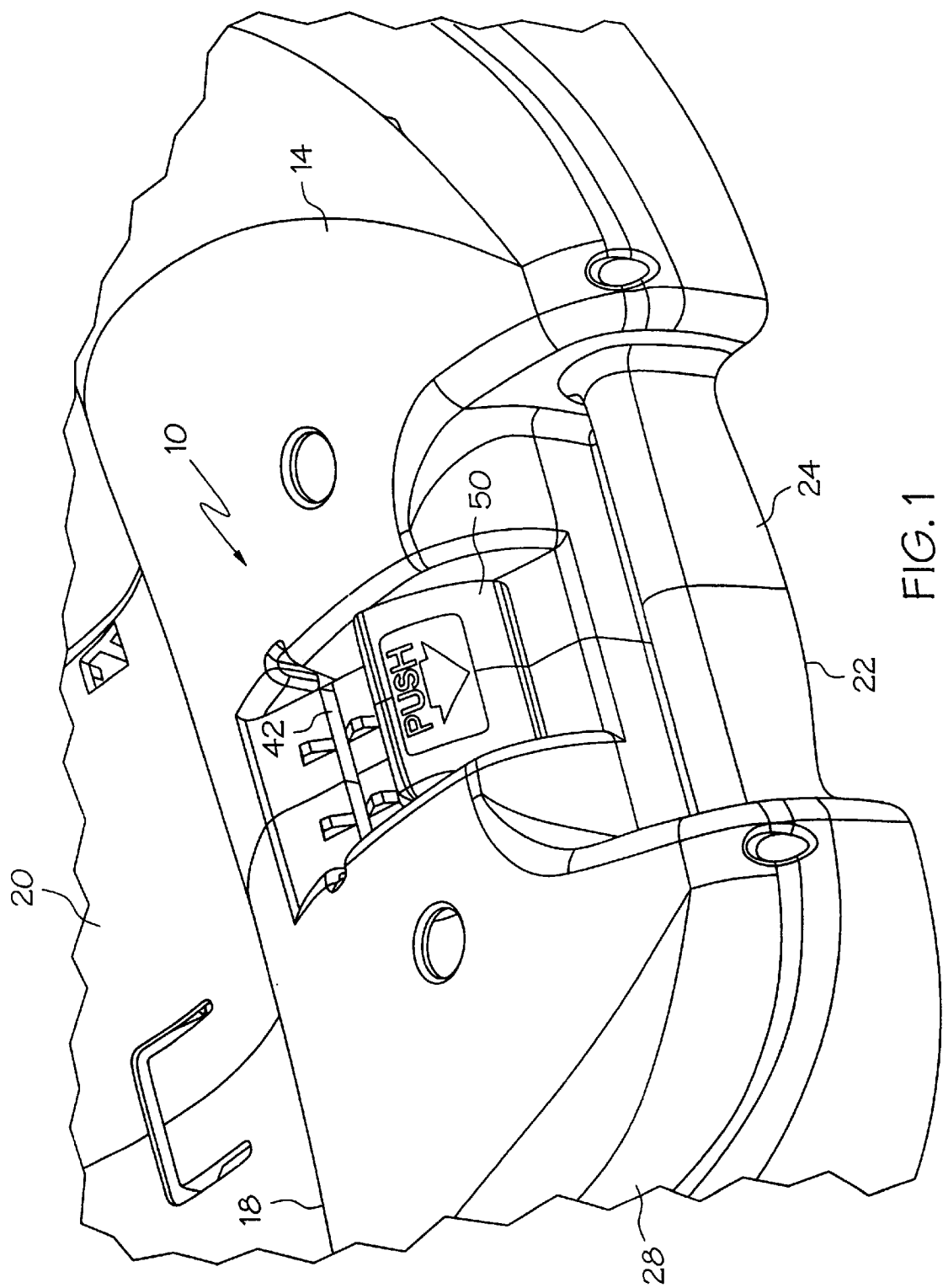
FIG. 1 is a perspective view of a new and improved buckle latch mechanism for infant car seat.
Figure 2:
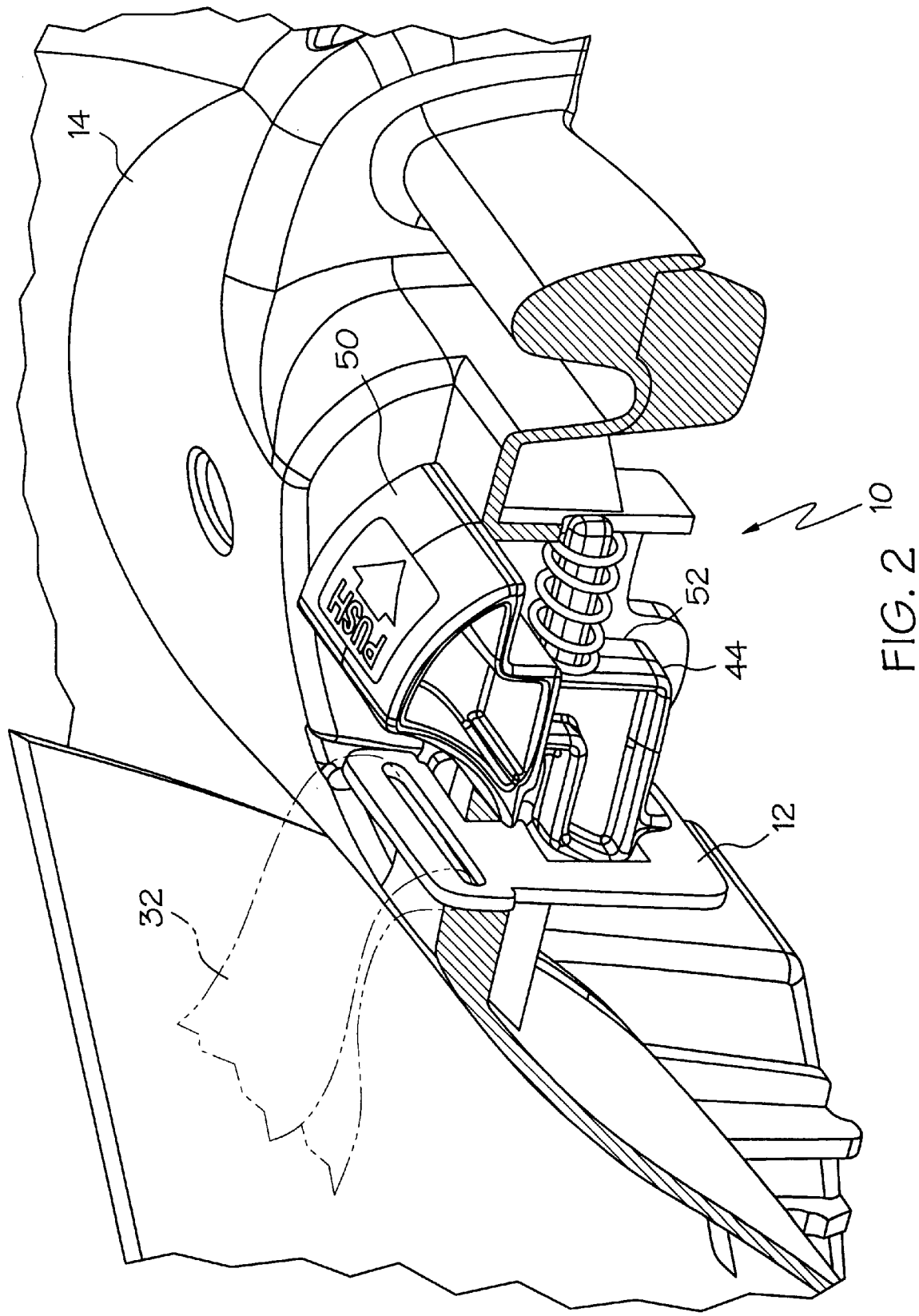
FIG. 2 is perspective view similar to FIG. 1, but with parts removed to show certain internal constructions thereof.
Figure 3:
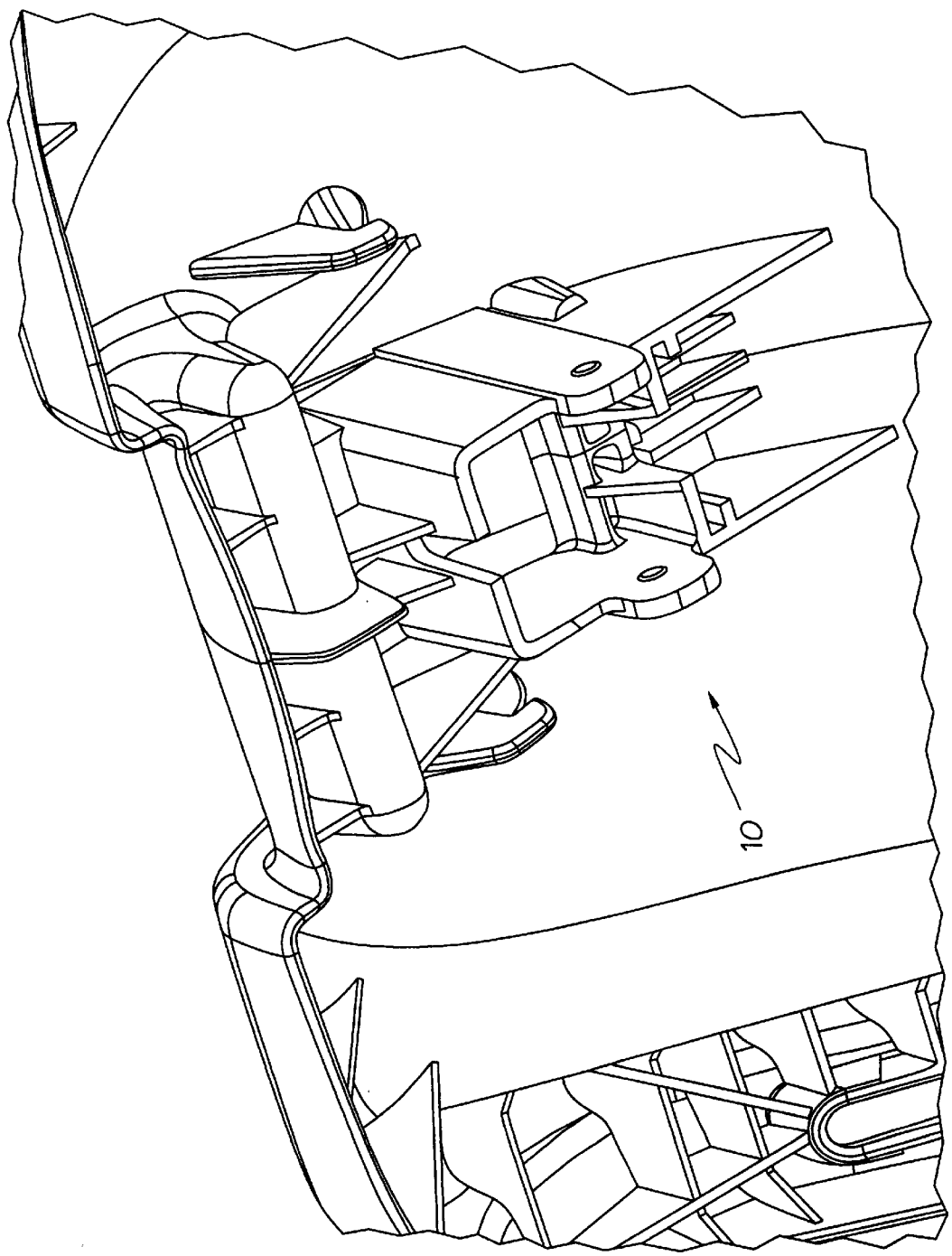
FIG. 3 is a bottom elevational view of the latch of FIGS. 1 and 2.
Figure 4:
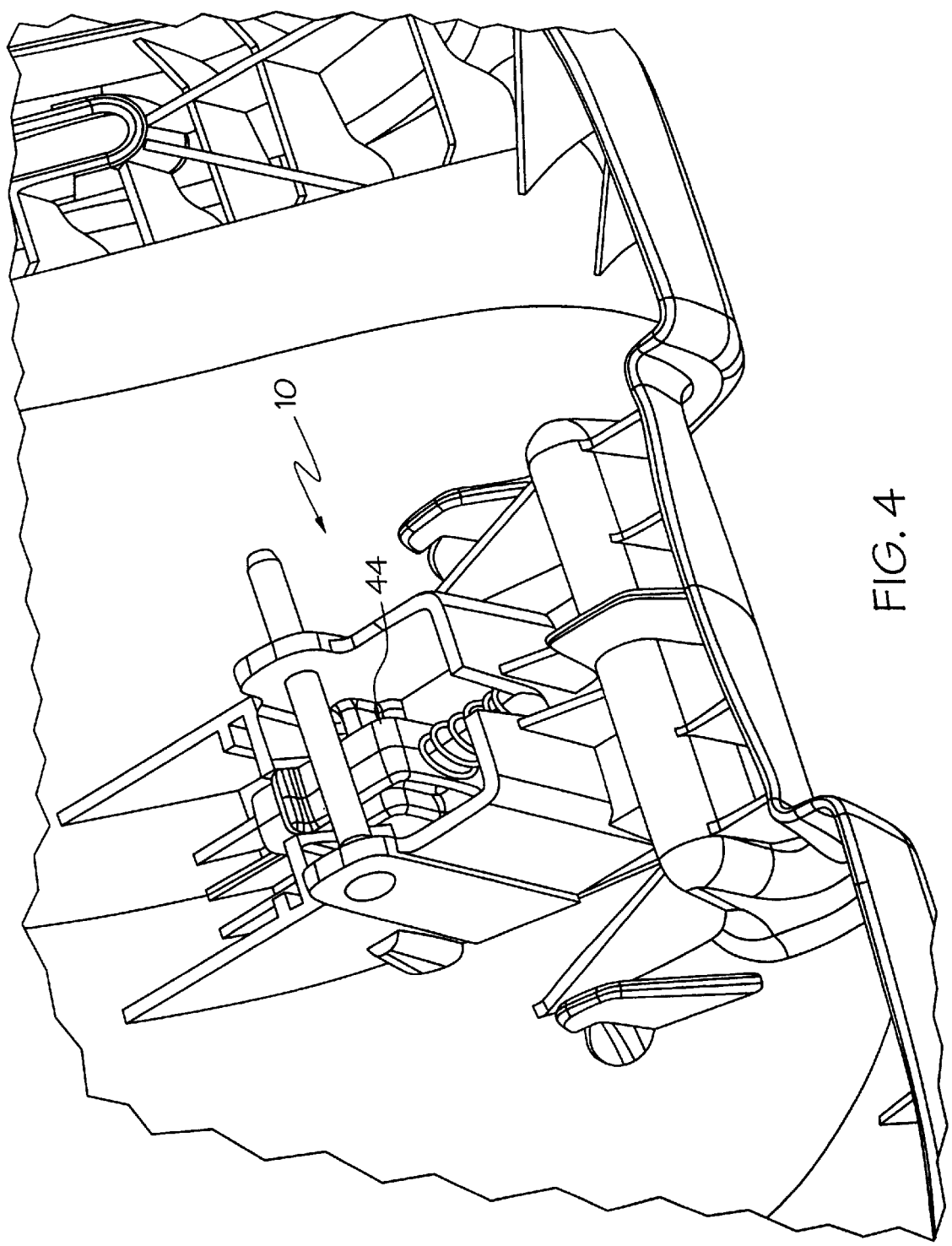
FIG. 4 is a bottom perspective view similar to FIG. 3 but taken from the opposite side thereof.
Figure 5:
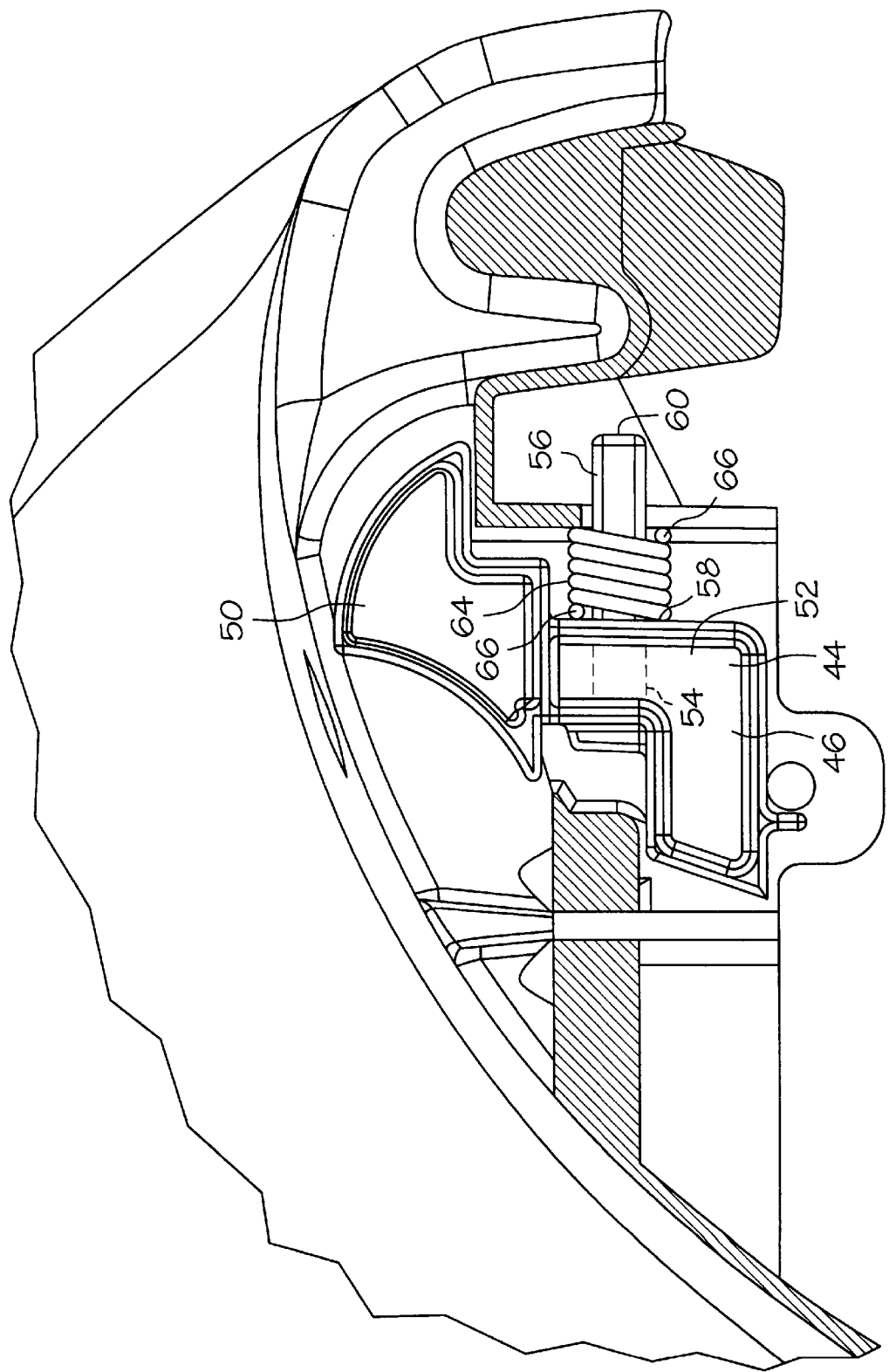
FIG. 5 is a cross-sectional view of the locking mechanisms with the latch in the retracted orientation.
Figure 6:
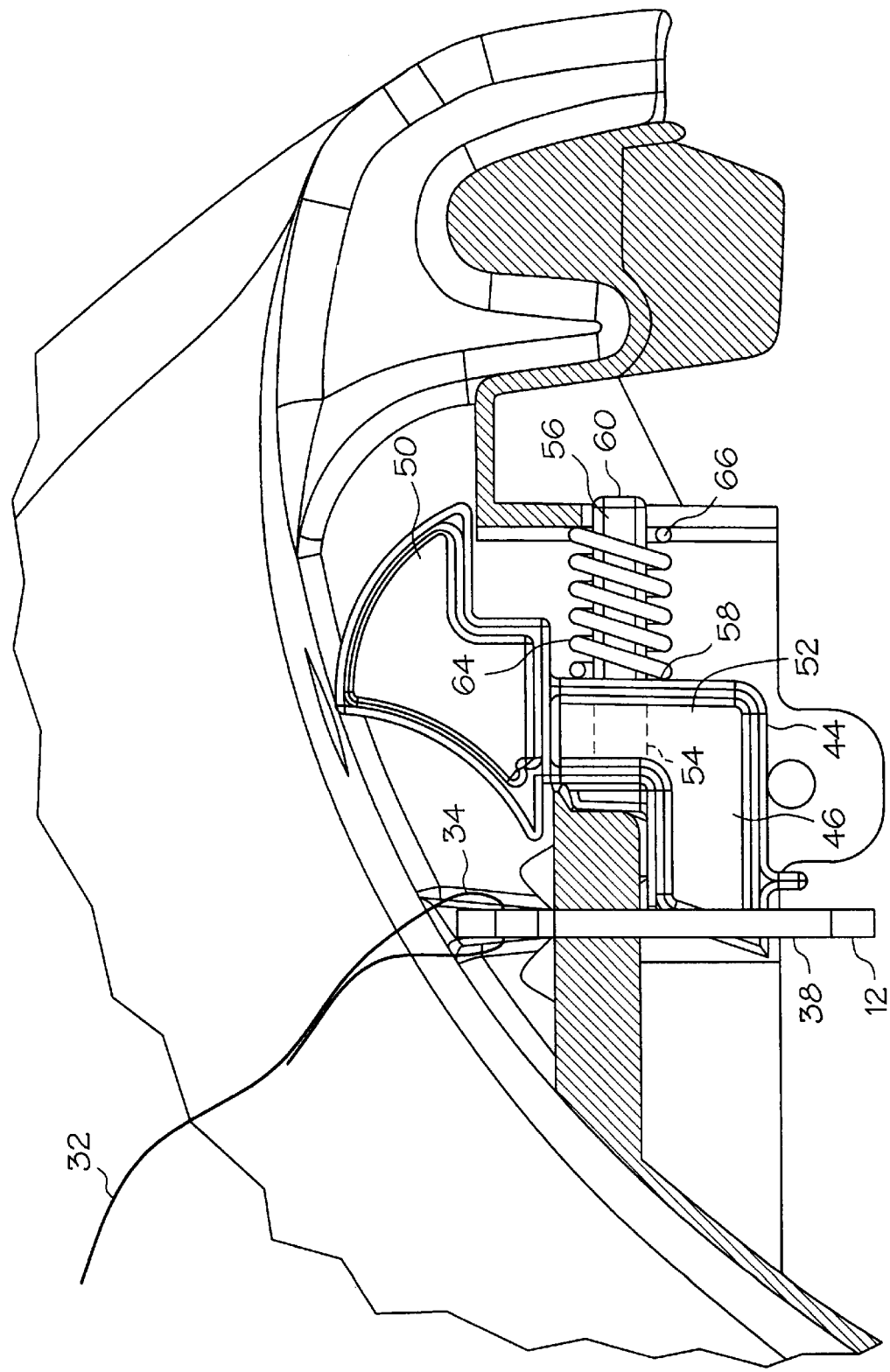
FIG. 6 is a cross-sectional view of the latch mechanism shown in the deployed orientation.

With reference now to the drawings, and in particular to FIG. 1 thereof, the preferred embodiment of the new and improved buckle latch mechanism for an infant carrier embodying the principles and concepts of the present invention and generally designated by the reference numeral 10 will be described.

The present invention, a buckle latch mechanism for an infant carrier 10 is comprised of a plurality of components. Such components in their broadest context include an essentially rigid frame, a belt assembly, and a buckle latch mechanism. Such components are individually configured and correlated with respect to each other so as to attain the desired objective.

A new and improved buckle latch mechanism 10 for receiving and retaining the tongue 12 of a belt assembly of an infant carrier 14 includes an essentially rigid frame 18.

The frame has an upper surface 20 for receiving padding and a child thereon. The frame also has a lower surface 22 for being supported on a recipient area. The frame also has a foot end 24 and a head end with generally parallel side walls 28 therebetween.

A belt assembly 32 is provided for retaining a child safely positioned within the shell. The belt assembly has a lower free end 34 with a rigid tongue 12 formed with an aperture 38 therethrough. The aperture is adapted to be selectively received and retained by a buckle latch mechanism 10.

A buckle latch mechanism comprises a slot 42 formed in the frame adjacent the foot end essentially transverse to the side walls. A generally rigid plastic latch 44 is reciprocally mounted in the frame forwardly of the slot. The latch 44 has a rearwardly extending lower extent 46 beneath the frame. The lower extent is movable from a locking position beneath the slot to an unlocked position forwardly of the slot. The rearward end of the lower extent is angled whereby downward movement of a tongue thereagainst will move the latch forwardly.

The latch has an operator controlled upper extent 50 above the frame movable between a locked orientation in proximity to the slot and an unlocked positioned forwardly thereof. The latch has a vertically extending intermediate extent 52 between the lower extent and the upper extent. The intermediate extent has a cylindrical aperture 54 therethrough.

A horizontal post 56 fixedly positioned beneath the upper surface of the frame has a rearward end 58 adjacent to the slot and a forward end 60 at an adjacent portion of the frame.

Next provided is a coil spring 64. The coil spring has a rearward end 66 in contact with the intermediate portion of the lock urging the lock rearwardly with the lower extent into the locking orientation. The spring has a forward end 68 providing an abutment surface for the transmission of force to urge the lock rearwardly but to allow movement of the lock forwardly against the action of the spring upon an operator's forward motion of the upper portion of the lock.

The invention is an improved harness buckle latch for an infant carrier or car seat. It consists of a structure molded into the seat shell, a molded plastic latch, a compression spring and a single fastener. The configurations of these components are illustrated in the attached drawings. A steel buckle tongue attached to a harness system, typical of those used In current designs, completes the required components for the functioning assembly.

Details molded into the shell consist of a rib structure to contain the plastic latch directly below the seating surface and a slot through the seating surface to locate the steel buckle tongue. The plastic latch has a plunger at one end and a post at the opposite end that locates the compression spring. The spring biases the plunger to penetrate the buckle-tongue when the tongue is fed through the slot in the shell. A portion of the plastic latch protrudes up through the shell and acts as a release button. This button is located directly In front of the tongue slot. As the user applies force to the release button, the spring compresses and the plunger slides free of the tongue that can now be pulled from the slot. The fastener retains the assembly in the shell.

Assembly is performed from the bottom of the plastic shell. The spring is slid over the post on the latch which is then aligned with the rib structure and snapped into position so that the release button portion of the part protrudes through the shell. The fastener is secured through two ribs on either side of the latch and the assembly is complete. No tools are required except for those required for the particular fastener.

This invention reduces the number of components (and cost) required to provide a latching mechanism for the restraint system of an infant's car seat. The reduced parts count and simplicity of the design reduces assembly time and thus the cost of assembly. All assembly is done from the bottom of the shell, easing assembly. The particular combination of molded-in shell details, a plastic latch, a spring and a single fastener to complete the functioning assembly is new.

As to the manner of usage and operation of the present invention, the same should be apparent from the above description. Accordingly, no further discussion relating to the manner of usage and operation will be provided.

Additional features of the system in which the present invention may be utilized are disclosed in copending U.S. patent application Ser. Nos. 09/177,176, 09/177,178 and 09/177,179 entitled Handle Adjustment Mechanism, Improved Autobase for Infant Car Seat and Infant Car Seat, all filed Oct. 22, 1998, the subject matter of which is incorporated herein by reference.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved buckle latch mechanism for receiving and retaining a tongue of a belt assembly of an infant carrier comprising, in combination:
    an essentially rigid frame having an upper surface for receiving padding and a child thereon, a lower surface for being supported on a recipient area and having a foot end and a head end with generally parallel side walls therebetween;
    a belt assembly for retaining a child safely positioned within the frame, the belt assembly having a lower free end with a rigid tongue formed with an aperture therethrough adapted to be selectively received and retained by a buckle latch mechanism; and
    a buckle latch mechanism comprising a slot formed in the frame adjacent the foot end essentially transverse to the side walls, a generally rigid plastic latch reciprocally mounted in the frame forwardly of the slot, the latch having a rearwardly extending lower extent beneath the frame movable from a locking position beneath the slot, to an unlocked position forwardly of the slot, the rearward end of the lower extent being angled whereby downward movement of a tongue thereagainst will move the latch forwardly, the latch having an operator controlled upper extent above the frame movable between a locked orientation in proximity to the slot and an unlocked position forwardly thereof, the latch having a vertically extending intermediate extent between the lower extent and the upper extent, the intermediate extent having a cylindrical aperture therethrough;
    a horizontal post fixedly positioned beneath the upper surface of the frame having a rearward end adjacent to the slot and a forward end at an adjacent portion of the frame;
    a coil spring having a rearward end in contact with the intermediate extent of the latch urging the latch rearwardly with the lower extent into a locking orientation, the spring having a forward end providing an abutment surface for transmission of a force to urge the latch rearwardly but to allow movement of the latch forwardly against the action of the spring upon an operator's forward motion of the upper portion of the latch.

2. A buckle latch mechanism for an infant carrier comprising:
    a buckle latch mechanism comprising a slot formed in a frame adjacent a foot end of an infant carrier essentially transverse to side walls of the infant carrier, a generally rigid plastic latch reciprocally mounted in the frame forwardly of the slot, the latch having a rearwardly extending lower extent beneath the frame movable from a locking position beneath the slot, to an unlocked position forwardly of the slot, the latch having an operator controlled upper extent above the frame movable between a locked orientation in proximity to the slot and an unlocked position forwardly thereof, the latch having a vertically extending intermediate extent between the lower extent and the upper extent, the intermediate extent having a cylindrical aperture therethrough;
    a horizontal post fixedly positioned beneath the upper surface of the frame having a rearward end adjacent to the slot and a forward end at an adjacent portion of the frame;
    a spring having a rearward end in contact with the intermediate extent of the latch urging the latch rearwardly with the lower extent into the locking orientation, the spring having a forward end providing an abutment surface for transmission of a force to urge the latch rearwardly.

3. The mechanism as set forth in claim 2 wherein a rearward end of the lower extent is angled whereby downward movement of a tongue thereagainst when inserted in the slot will move the latch forwardly.

4. A buckle latch mechanism for an infant carrier comprising:
    a buckle latch mechanism comprising a slot formed in a frame adjacent a foot end of an infant carrier, a generally rigid latch reciprocally mounted in the frame forwardly of the slot, the latch having a rearwardly extending lower extent beneath the frame movable from a locking position beneath the slot, to an unlocked position forwardly of the slot, the latch having an operator controlled upper extent accessible from above the frame and movable between a locked orientation in a first position relative to the slot and an unlocked orientation at a second position forwardly thereof, the latch having an intermediate extent connecting the lower extent and the upper extent;

a spring positioned to urge the latch rearwardly for biasing the lower extent into the locking position beneath the slot.

5. The mechanism as set forth in claim 4 wherein a rearward end of the lower extent is angled whereby downward movement of a tongue thereagainst when inserted in the slot will move the latch forwardly.

6. The mechanism as set forth in claim 4 wherein the intermediate extent has an aperture therethrough, further comprising a post positioned below the upper surface of the frame having a rearward end positioned toward the slot and a forward end positioned away from the slot, the post passing through the aperture in the intermediate extent.

* * * * *